United States Patent [19]

Kopich

[11] 4,422,690
[45] Dec. 27, 1983

[54] SEAT POSITION CONTROL MECHANISM

[75] Inventor: Leonard F. Kopich, Madison Heights, Mich.

[73] Assignee: General Motors Corporation, Detroit, Mich.

[21] Appl. No.: 275,833

[22] Filed: Jun. 22, 1981

[51] Int. Cl.$^3$ .............................................. B60H 1/04
[52] U.S. Cl. .................................. 297/341; 248/393; 296/65 R; 297/379
[58] Field of Search ............... 297/341, 342, 343, 379; 248/393, 398; 296/65 R

[56] References Cited

U.S. PATENT DOCUMENTS

| | | | |
|---|---|---|---|
| 2,160,015 | 5/1939 | Haberstump | 297/341 |
| 2,856,983 | 10/1958 | Probst et al. | 297/341 |
| 3,853,373 | 12/1974 | Corbett | 297/341 |
| 3,890,001 | 6/1975 | Turner | 297/341 |
| 3,940,182 | 2/1976 | Tamura | 297/341 |
| 4,065,178 | 12/1977 | Carella et al. | 297/341 |
| 4,101,169 | 7/1978 | Muraishi et al. | 297/341 |
| 4,143,911 | 3/1979 | Sakakibara et al. | 297/341 |
| 4,159,147 | 6/1979 | Kyomitsu | 297/341 |

FOREIGN PATENT DOCUMENTS

| | | | |
|---|---|---|---|
| 2724048 | 12/1978 | Fed. Rep. of Germany | 297/341 |
| 52-13220 | 2/1977 | Japan | 297/341 |
| 55-47923 | 4/1980 | Japan | 297/341 |
| 55-91427 | 7/1980 | Japan | 297/341 |
| 2033738 | 5/1980 | United Kingdom | 297/341 |

Primary Examiner—James T. McCall
Attorney, Agent, or Firm—Herbert Furman

[57] ABSTRACT

A seat position control mechanism includes a pair of track members, a detent member secured to one track member and having a plurality of longitudinally spaced recesses, and a second detent member secured to the other track member and having a single recess. A pawl which is manually controlled or controlled by tilting movement of the seat back is engageable with one of the spaced recesses and a single recess to lock the track members to each other. The seat can be adjusted by operating the manual control to release the pawl from a spaced recess while remaining in engagement with the single recess to unlock the track members. Tilting movement of the seat back or use of the manual control moves the pawl out of the single recess while remaining in engagement with the spaced recess. Return of the pawl into engagement with the single recess re-establishes the seat in the initial starting position and locks the track members to each other.

4 Claims, 5 Drawing Figures

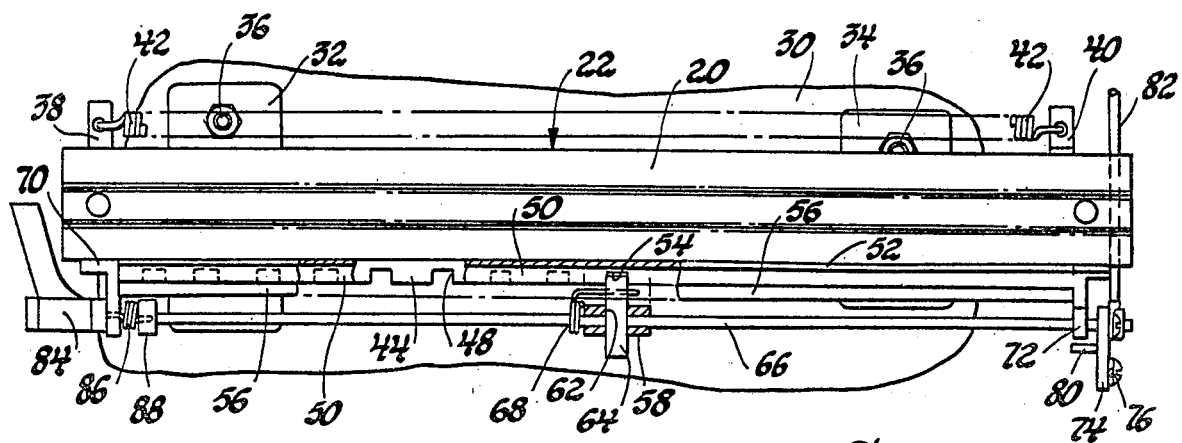
Fig. 2
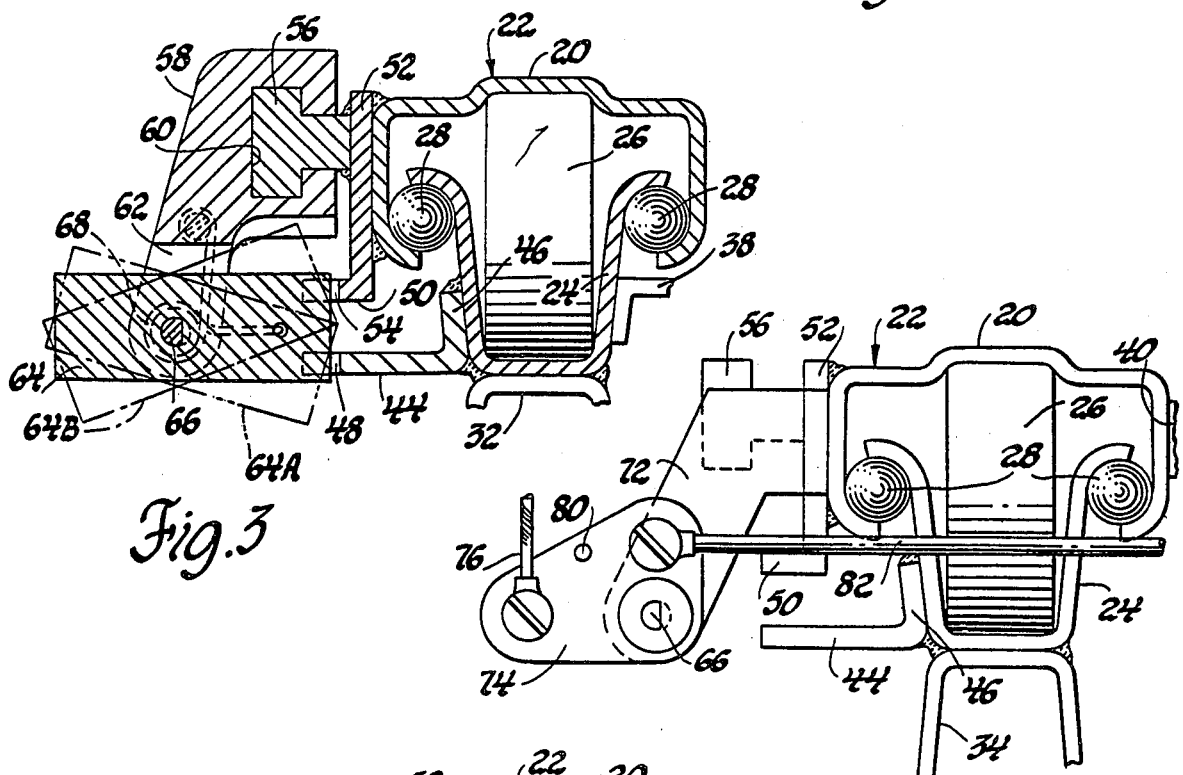
Fig. 3
Fig. 4
Fig. 5

SEAT POSITION CONTROL MECHANISM

This invention relates to a seat position control mechanism for a vehicle seat and more particularly to such a mechanism which permits a vehicle seat to be adjusted to a plurality of horizontal positions and to be moved to a forwardly displaced easy enter position and returned to the initial starting position upon tilting movement of the seat back or manual actuation of an operator.

BACKGROUND OF THE INVENTION

It is known in the prior art to provide vehicle seats which can be horizontally adjusted to a plurality of positions and which can also be displaced forwardly to an easy enter position upon tilting movement of a vehicle seat back. Such seats are supported for movement by track mechanisms and are of two general types. In one type, tilting movement of the seat back moves the seat to the easy enter position and return of the seat back to upright position moves the seat to its rearwardmost position. Thereafter the seat must be readjusted to the desired horizontal position. In the other type, the return of the seat back to the upright position returns the seat to the initial starting position.

The seat control mechanism of this invention is of the latter type but differs from prior art mechanisms in that, in its preferred embodiment, it includes a pawl which is movable relative to two elongate detent members in order to obtain movement of the seat to the various desired positions. One detent member is mounted to one track member and includes a number of longitudinally spaced recesses. The other detent member is mounted to the other track member and includes only a single recess. The pawl is supported for rotative movement relative to the recesses of the detent members by a support which is slidably mounted on a guide mounted to the other track member. The rotative movement of the pawl is controlled by a control rod mounted to the other track member and slidably and non-rotatably connected to the pawl. The control rod is rotated either by a manual operator or by a connection to the tilting seat back. The pawl and control rod are resiliently biased to normally locate the pawl in engagement with one of the spaced recesses and the single recess to lock the track members to each other.

In order to adjust the seat to a desired horizontal position, the manual operator is actuated to rotate the control rod. This unlocks the track members as the pawl rotates out of engagement with the one spaced recess while remaining in engagement with the single recess. After movement of the seat to the desired position, the actuator is released and the pawl is returned into engagement with the one spaced recess indicative of the desired position to lock the track members to each other. To move the seat to the easy enter position, the seat back is tilted forwardly from the normal upright position to rotate the control rod and move the pawl out of the single recess while remaining in engagement with the one spaced recess. This unlocks the track members for forward displacement of the seat and other track member to the easy enter position. The guide and control rod move with the other track member relative to the pawl support, the pawl, and the one track member. Upon return of the seat back to the upright position, the seat can be displaced rearwardly toward its initial starting position. During this movement, the pawl rides along the other detent member until it comes into engagement with the single recess thereof to again lock the track members to each other in the initial starting position of the seat. Once the seat has started to move toward the easy enter position, the seat back can be returned to its upright position since the pawl will ride along the other detent member. The manual operator can also be actuated to rotate the control rod and move the pawl out of the single recess in order to obtain forward displacement of the seat to the easy enter position. Again, once the seat has started to move toward the easy enter position the manual operator can be released.

If desired, the track members may be curved so as to provide for upward movement of the seat upon forward displacement thereof. The guide and detent members can be correspondingly curved to ensure that the pawl always has the same relationship to the detent members. The control rod for the pawl carries no loads and therefore can be flexible so as to flex as the pawl support and pawl move relative to the control rod upon forward displacement of the seat to the easy enter position and return of the seat to the initial starting position.

The primary feature of this invention is that it provides an improved seat position control mechanism for a horizontally displaceable vehicle seat which permits the seat to be adjusted to a number of horizontal positions and also permits the seat to be displaced forwardly to an easy enter position and returned to its initial starting position. Another feature is that it provides such a mechanism having seat track members which are locked to each other by a movable pawl engageable in pawl receiving recesses provided in detent members on each of the track members. A further feature is that one of the detent members includes a number of spaced recesses and the other detent member includes only a single recess, with the pawl being receivable in one of the spaced recesses and the single recess to lock the track members and set the horizontal position of the seat. Yet another feature is that the pawl is rotatable out of engagement with the one spaced recess while remaining in engagement with the single recess to unlock the track members and permit horizontal adjustment of the seat. Yet a further feature is that the pawl is rotatable out of engagement with the single recess while remaining in engagement with the one spaced recess to unlock the track members and permit the seat to be displaced from an initial starting position to an easy enter position, with return of the seat to the initial starting position permitting the pawl to again reengage the single recess to reestablish the seat in the initial starting position. Still another feature is that the pawl can be moved to its various positions either through a control rod which is manually actuated or by tilting movement of the seat back.

These and other features will be readily apparent from the following specification and drawings wherein:

FIG. 2 is a plan view taken generally along the plane indicated by line 2—2 of FIG. 1.

FIG. 3 is an enlarged sectional view taken generally along the plane indicated by line 3—3 of FIG. 1.

FIG. 4 is an enlarged rear view taken generally along the plane indicated by line 4—4 of Fig. 1, and FIG. 5 is an enlarged sectional view taken generally along the plane indicated by line 5—5 of FIG 1.

DESCRIPTION OF THE PREFERRED EMBODIMENT

Figure 1:
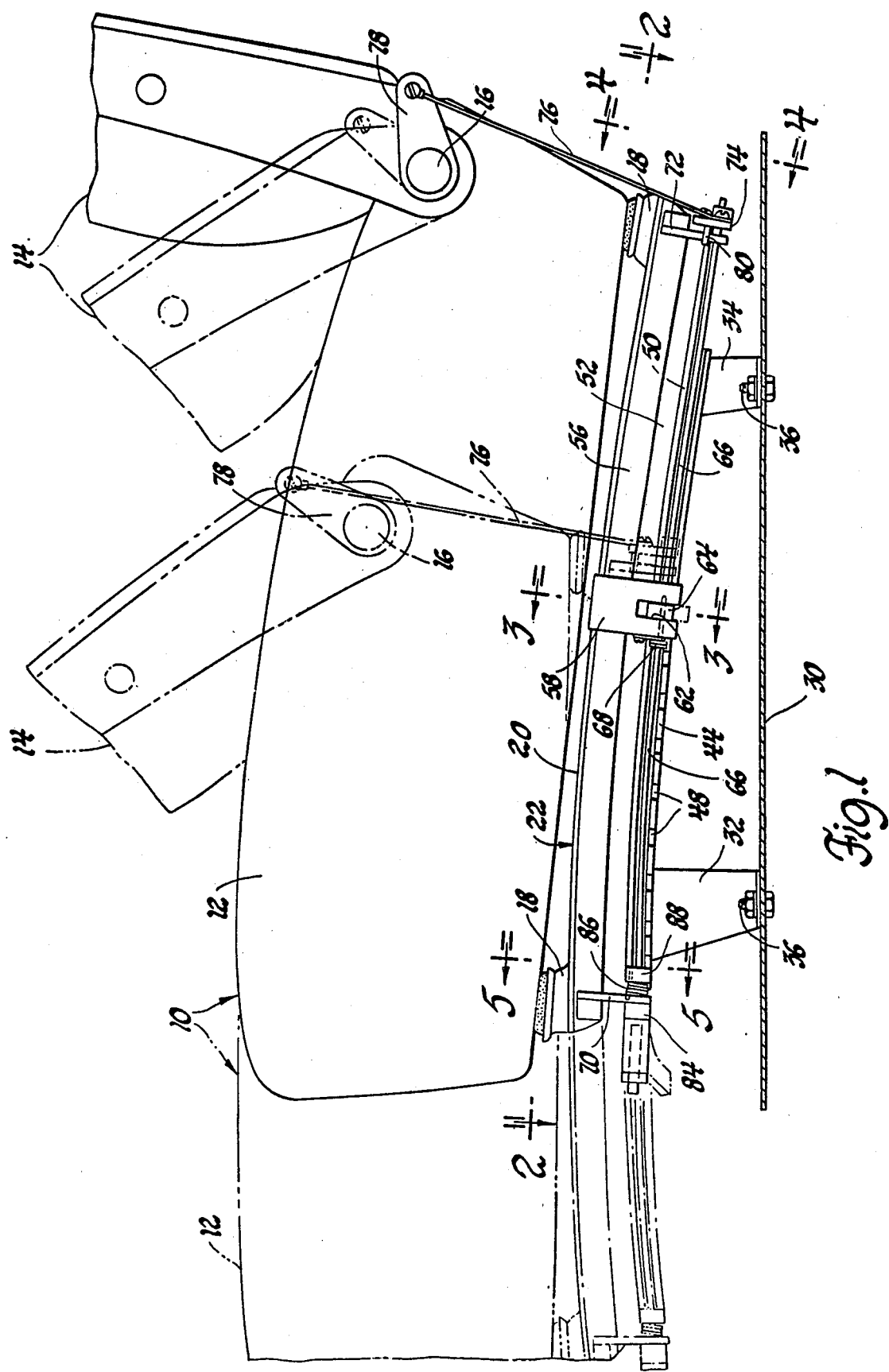
FIG. 1 is a partial side elevational view of a vehicle seat embodying a seat position control mechanism according to this invention, with the seat back being shown in full lines in a normal upright position and in dash lines in a forwardly tilted position.

Referring now to FIG. 1, a conventional vehicle seat 10 includes a seat cushion 12 and a seat back 14 having an outboard pivot 16 and a like inboard pivot, not shown, for pivoting the seat back to the seat cushion for movement between an upright position shown in full lines therein and a forwardly tilted position indicated by dash lines. The seat cushion and seat back are of conventional structure and form no part of this invention. The seat cushion 12 includes a seat frame, not shown, which is conventionally secured at 18 at the forward and rearward ends thereof to the upper track member 20 of an outboard seat track mechanism 22. As shown in FIGS. 3, 4 and 5, the upper track member 20 is of generally U-shaped cross-section and straddles a lower track member 24. A plurality of rollers 26 seat on the base walls of the upper and lower track members to vertically space the track members and provide for relative longitudinal movement therebetween. A plurality of ball bearings 28 seat between opposed arcuate flanges of the upper and lower track members in a conventional manner to prevent lateral displacement of the track members relative to each other during their longitudinal movement. The seat track mechanism 22 is conventional and other shapes of track members as well as other types of bearing arrangements between the track members may be used, if desired.

The lower track member 24 is supported on the vehicle floor pan 30 by forward and rearward U-shaped brackets 32 and 34, FIGS. 3 and 4. The bases of the brackets are welded to the base wall of the lower track member 24 and the flanges of the brackets are conventionally bolted at 36 to the floor pan 30.

An angle bracket 38, FIG. 5, welded to the inboard side wall of lower track member 24 adjacent the forward end thereof and a like angle bracket 40, FIG. 4, welded to the inboard side wall of the upper track member 20 adjacent the rearward end thereof are interconnected by a coil tension spring 42 in order to continually bias the upper track member forwardly or to the left as viewed in FIGS. 1 and 2 relative to the lower track member.

The seat 10 further includes an inboard track mechanism, not shown, which includes the same track members supporting the seat on the floor pan of the vehicle. These track members may be interconnected by a coil tension spring 42 in the same manner as the outboard track members, if desired.

An elongate first detent member 44 has a flange 46 thereof welded to the outboard side wall of the lower track member 24. The detent member 44 includes a number of longitudinally spaced notches or recesses 48. An alongate second detent member 50 has a flange 52 thereof welded to the outboard side wall of the upper track member 20. This detent member includes a single notch or recess 54. A generally T-shaped elongate rail or guide 56 has the shank thereof welded or otherwise secured to the flange 52 of the detent member 50. The detent members 44 and 50 and the guide 56 follow the general curvature of the upper and lower track members as can be seen in FIG. 1. A pawl support 58 includes a generally T-shaped passage 60, FIG. 3, which frictionally receives the guide 56 therethrough and slidably mounts the support 58 on the guide for relative movement therebetween. The support 58 will remain in any adjusted position longitudinally of the guide 56 unless moved relative thereto by a predetermined force. The support 58 includes a slot 62 which pivotally receives a pawl 64. A control rod 66 extends through the support 58 and pawl to pivotally mount the pawl 64 to the support. As shown in FIGS. 1, 2, and 3, a coil torsion spring 68 surrounds the control rod and has one leg hooked to the pawl and the other leg secured to the support 58. The spring 68 normally locates the pawl 64 in its full line position shown in FIG. 3 wherein the pawl is received in both the single recess 54 of the detent member 50 and one of the spaced recesses 48 of the detent member 44. In this position of the pawl, the upper and lower track members are locked to each other to thereby fix the seat in one of a number of horizontally adjusted positions, the number of these positions being equal to the number of recesses 48.

As shown in FIG. 3, the control rod 66 is of general D-shape cross-section and the opening through the pawl 64 is of the same cross-section in order to slidably and non-rotatably couple the control rod to the pawl. The openings in the support 58 for the control rod 66 are circular.

The control rod 66 is rotatably supported on the upper track member 20 by angle brackets 70 and 72 adjacent the forward and rearward ends respectively of the outboard side wall of the track member. These angle brackets are provided with suitable bushed apertures to rotatably mount the control rod 66 thereto. A triangular bell crank or lever 74 is secured to the control rod 66 adjacent the rearward end thereof. A slack cable 76 connects one leg of the lever 74 to a lever 78, FIG. 1, which is fixed to the seat back outboard pivot 16 and rotated counterclockwise upon forward tilting movement of the seat back 14 from its full line position to its dash line position to shift the cable 76 upwardly and rotate the lever 74 clockwise as viewed in FIG. 4. The resultant rotation of the control rod 66 rotates the pawl 64 clockwise as viewed in FIG. 3 to its dash line position 64A for a purpose to be hereinafter described. The lever 74 includes a pin 80 or other suitable stop which is engageable with the bracket 72 after a predetermined number of degrees of clockwise rotation of the lever 74. The lever 74 is connected by a linkage or rod 82 to the inboard latch, not shown, provided on the inboard track mechanism between the upper and lower track members thereof.

As best shown in FIGS. 1 and 5, a manually operable handle 84 is secured to the control rod 66 forwardly of the bracket 70. A coil torsion spring 86 surrounds the control rod rearwardly of the bracket 70 and is secured to both the bracket and to a collar 88 fixed to the control rod to thereby normally locate the control rod in its position shown and resist rotational movement thereof in either direction from this position. The force of the spring 86 is additive to that of the spring 68.

When the passenger desires to adjust the horizontal position of the seat, the handle 84 is manually rotated to its position 84B, FIG. 5, to rotate the control rod 66 and pawl 64 counterclockwise as viewed in FIG. 3 against the combined action of the springs 86 and 68. The pawl 64 will rotate to position 64B out of engagement with the one spaced recess 48 of detent member 44 while remaining in engagement with the single recess 54 of the detent member 50. The inboard latch, not shown, between the inboard track is released through lever 74 and rod 82. Thereafter, the passenger can adjust the seat to the desired position either against or with the action of spring 42. When the handle 84 is then released, the control rod 66 is returned to its normal position by the combined action of the springs 68 and 86 to move the pawl 64 into engagement with whatever recess 48 is at this position or closest thereto. The inboard latch is also simultaneously re-engaged.

If it is desired to displace the seat forwardly to the easy enter position, the seat back 14 is tilted forwardly about the pivots 16 from its normal upright position shown in full lines in FIG. 1 to its dash line position shown therein. This rotates the lever 74, the control rod 66, and pawl 64 clockwise as viewed in FIGS. 3 and 4. The pawl 64 rotates to position 64A, out of engagement with the single recess 54 while remaining in engagement with the one spaced recess 48 of the detent member 44. Thereafter, the seat can be forwardly displaced to the easy enter position by the spring 42. When it is desired to return the seat to its initial starting position, the seat back 14 is returned to its upright position and the seat moved rearwardly. During this movement, the pawl 64 will ride along the edge of the detent member 50 under the action of springs 68 and 86 until the recess 54 is aligned with the pawl whereupon the springs 68 and 86 will move the pawl into engagement with the recess 54 to re-establish the seat in its initial starting position.

It should be noted that the seat can be displaced to its easy enter position with the seat back upright by rotating the handle 84 to the position 84A, FIG. 5. Should the handle 84 be operated, the handle can be released upon initial forward movement of the seat since the pawl 64 will ride along the detent member 50 during the remainder of the forward movement of the seat to easy enter position and also during subsequent rearward movement of the seat to its initial starting position. Likewise, after initial tilting movement of the seat back 14 and initial forward movement of the seat, the seat back can be returned to its upright position during the remainder of the seat movement to the easy enter position and return to the initial starting position. Thus, neither the handle 84 nor the seat back 14 need be maintained in its respective rotated or forwardly tilted position after initial forward movement of the seat toward the easy enter position.

If desired, an abutment or shoulder may be provided on the detent member 50 rearwardly of the single recess 54 for engagement by the pawl 64 during rearward movement of the seat from the easy enter position in order to ensure registry of the recess 54 with the pawl 64.

Although not shown herein, it will be understood that if vertical adjustment of the seat is desired, any conventional vertical adjustment arrangement can be provided between the lower track member 24 and the floor pan in place of the brackets 32 and 34.

Thus this invention provides an improved seat position control mechanism for horizontally adjustable vehicle seats.

The embodiments of the invention in which an exclusive property or privilege is claimed are defined as follows:

1. In a vehicle seat including a seat cushion, a seat back supported thereon for movement between an upright position and a tilted position, and a pair of track members for mounting the seat on a vehicle for relative longitudinal movement to a plurality of adjusted positions and an easy enter position, a seat position control mechanism comprising, in combination, a plurality of longitudinally spaced first locating means on one of the track members, a second locating means on the other track member, locator means movably mounted on the other track member for movement therewith and movement relative thereto, means biasing the locator means to a normal position in engagement with a first locating means and the second locating means to lock the track members in an adjusted position, operable means for moving the locator means to a seat adjustment position out of engagement with one of the first locating means while remaining in engagement with the second locating means to unlock the track members and permit movement of the track members to another adjusted position, and means alternately responsive to movement of the seat back to tilted position or actuation of the operable means for moving the locator means out of engagement with the second locating means while remaining in engagement with a first locating means to unlock the track members and permit the track members to move from an initial starting position to the terminal position, movement of the seat back to upright position or de-actuation of the operable means permitting movement of the track members from the terminal position to the initial starting position and re-engagement of the locator means with the second locating means under the action of the pawl biasing means to again lock the track members in the initial starting position.

2. In a vehicle seat including a seat cushion, a seat back supported thereon for movement between an upright position and a tilted position, and a pair of track members for mounting the seat on a vehicle for relative longitudinal movement to a plurality of adjusted positions and an easy enter position, a seat position control mechanism comprising, in combination, a first detent member on one of the track members having a plurality of longitudinally spaced first recesses, a second detent member on the other track member having a second recess registerable with any one of the first recesses, a pawl, a control member rotatably mounted on the other track member, means slidably and non-rotatably coupling the pawl and the control member, means normally rotatably locating the control member in a position to locate the pawl within a first recess and within the second recess to lock the track members in an adjusted position, operable means for rotating the control member to locate the pawl out of engagement with a first recess while remaining in engagement with the second recess to unlock the track members and permit movement of the track members to another adjusted position, and means responsive to movement of the seat back to tilted position for rotating the control rod to move the pawl out of engagement with the second recess while remaining in engagement with a first recess to unlock the track members for movement from an initial starting position to the terminal position, movement of the seat back to upright position permitting re-engagement of the pawl with the second recess when the track members return to the initial starting position.

3. In a vehicle seat including a pair of track members for mounting the seat on a vehicle for relative longitudinal movement to a plurality of adjusted positions and an easy enter terminal position, a seat position control mechanism comprising, in combination, an elongate detent member on one of the track members having a plurality of longitudinally spaced first recesses, a second elongate detent member on the other track member having a second recess, a pawl, means slidably mounted on the other track member and rotatably supporting the pawl for movement relative thereto, a control member rotatably mounted on the other track member and slidably and non-rotatably coupled to the pawl for rotating the pawl relative to the detent members, means locating the pawl in a normal position within a first recess and within the second recess to lock the track members in an adjusted position, means for rotating the control member to rotate the pawl out of the first recess while remaining within the second recess to unlock the track members and permit movement of the one track member and first detent member to another adjusted position relative the other track member and pawl, and means for rotating the control member to rotate the pawl out of the second recess while remaining within the first recess to unlock the track members and permit the other track member, second detent member, mounting means and control member to move relative to the one track member, first detent member and pawl from an initial starting position to the terminal position, movement of the track members from the terminal position to the initial starting position re-engaging the pawl with the second recess to again lock the track members in the initial starting position.

4. In a vehicle seat including a seat back movable between an upright position and a tilted position, and a pair of track members for mounting the seat on a vehicle for relative longitudinal movement to a plurality of adjusted positions and an easy enter position, a seat position control mechanism comprising, in combination, a first elongate detent member on one of the track members having a plurality of longitudinally spaced recesses, a second elongate detent member on the other track member having a second recess, a pawl, a pawl support slidably mounted on the other track member, a control rod rotatably mounted on the other track member and slidably and non-rotatably coupled to the pawl, the control rod providing the pivotal connection between the pawl and pawl support, means locating the pawl in a normal position within a first recess and within the second recess to lock the track members in an adjusted position, manually operable means coupled to the control rod for rotating the pawl out of the first recess while remaining in the second recess to unlock the track members and permit movement of the track members to another adjusted position, and means coupling the seat back to the control rod for moving the pawl out of the second recess while remaining in the first recess to unlock the track members and permit the track members to move from an initial starting position to the terminal position upon movement of the seat back to tilted position, movement of the seat back to upright position permitting movement of the track members from the terminal position to the initial starting position and re-engagement of the pawl with the second recess to again lock the track members in the initial starting position.

* * * * *